United States Patent
Gao et al.

(10) Patent No.: US 11,071,035 B2
(45) Date of Patent: *Jul. 20, 2021

(54) RADIO LINK MONITORING AND CELL SEARCH TECHNIQUES FOR HIGH MOVEMENT SPEEDS

(71) Applicant: Apple Inc., Cupertino, CA (US)

(72) Inventors: Jishan Gao, Beijing (CN); Yong Zhong, Beijing (CN); Shangfeng Li, Beijing (CN); Lijie Zhang, Beijing (CN); Qiang Miao, Beijing (CN); Ying Zhang, Beijing (CN); Yaoqi Yan, Beijing (CN); Zhiwei Wang, Beijing (CN); Tao Xie, Beijing (CN); Junzhen Qin, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,407

(22) Filed: Sep. 14, 2020

(65) Prior Publication Data
US 2020/0413317 A1    Dec. 31, 2020

Related U.S. Application Data

(63) Continuation of application No. 16/605,335, filed as application No. PCT/CN2017/083073 on May 4, 2017.

(51) Int. Cl.
*H04W 36/00*   (2009.01)
*H04W 36/32*   (2009.01)
(Continued)

(52) U.S. Cl.
CPC ........... *H04W 36/32* (2013.01); *H04W 4/027* (2013.01); *H04W 24/08* (2013.01);
(Continued)

(58) Field of Classification Search
CPC ..... H04W 36/30; H04W 36/18; H04W 36/08; H04W 36/14; H04W 36/12; H04W 36/32;
(Continued)

(56) References Cited

U.S. PATENT DOCUMENTS

| | | |
|---|---|---|
| 2014/0146794 A1 | 5/2014 | Dalsgaard |
| 2015/0131553 A1 | 5/2015 | Centonza et al. |

(Continued)

FOREIGN PATENT DOCUMENTS

| | | |
|---|---|---|
| CA | 2981190 | 10/2016 |
| CN | 102870469 | 1/2013 |

(Continued)

OTHER PUBLICATIONS

International Search Report for PCT/CN2017/083073, dated Jan. 26, 2018.

(Continued)

*Primary Examiner* — Temica M Beamer
(74) *Attorney, Agent, or Firm* — Kowert, Hood, Munyon, Rankin & Goetzel, P.C.

(57) ABSTRACT

This disclosure relates to techniques for performing radio link monitoring and cell searching when moving at high speeds. A movement speed of a wireless device may be determined. When performing a cell search, the manner of the cell search may depend on the movement speed of the wireless device, potentially including cells that are associated with high movement speed being more highly prioritized when the wireless device is determined to be at a higher movement speed than when the wireless device is determined to be at a lower movement speed.

20 Claims, 9 Drawing Sheets

(51) Int. Cl.
*H04W 76/19* (2018.01)
*H04W 76/28* (2018.01)
*H04W 36/30* (2009.01)
*H04W 4/02* (2018.01)
*H04W 24/08* (2009.01)
*H04W 64/00* (2009.01)

(52) U.S. Cl.
CPC ... *H04W 36/0061* (2013.01); *H04W 36/0088* (2013.01); *H04W 36/00837* (2018.08); *H04W 36/305* (2018.08); *H04W 64/006* (2013.01); *H04W 76/19* (2018.02); *H04W 76/28* (2018.02)

(58) Field of Classification Search
CPC ......... H04W 36/0083; H04W 36/0055; H04W 36/04; H04W 16/32; H04W 64/00; H04W 64/006; H04W 36/00837; H04W 36/305; H04W 36/0061; H04W 36/0088; H04W 76/19; H04W 76/28; H04W 4/027; H04W 24/08; H04M 11/04
USPC .......................... 455/436, 437, 438, 440, 441
See application file for complete search history.

(56) References Cited

U.S. PATENT DOCUMENTS

2019/0281440 A1    9/2019  Ly et al.
2020/0236605 A1*   7/2020  Yiu ........................ H04W 36/24

FOREIGN PATENT DOCUMENTS

| | | |
|---|---|---|
| CN | 104756549 A | 7/2015 |
| CN | 105338578 A | 2/2016 |
| CN | 106165491 A | 11/2016 |
| EP | 2779745 | 9/2014 |
| WO | WO2013045758 | 4/2013 |
| WO | 2014034090 A1 | 3/2014 |

OTHER PUBLICATIONS

First Office Action for Chinese Patent Application No. 201780090212.5, dated Mar. 26, 2021, 10 pages.

Search Report for Chinese Patent Application No. 201780090212.5, dated Mar. 26, 2021, 3 pages.

* cited by examiner

RADIO LINK MONITORING AND CELL SEARCH TECHNIQUES FOR HIGH MOVEMENT SPEEDS

PRIORITY CLAIM INFORMATION

This application is a continuation of U.S. application Ser. No. 16/605,335, filed on Oct. 15, 2019, titled "Radio Link Monitoring and Cell Search Techniques for High Movement Speeds", which is a national stage application of International Application No. PCT/CN2017/083073, filed on May 4, 2017, titled "Radio Link Monitoring and Cell Search Techniques for High Movement Speeds", which is hereby incorporated by reference in its entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, and more particularly to systems, apparatuses, and methods for performing radio link monitoring and cell searching when moving at high speeds.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (e.g., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through wireless devices used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

Additionally, wireless devices are used in an increasing range of contexts. For example, wireless devices may be used at a variety of movement speeds, e.g., ranging from relatively stationary or slow movement speeds (e.g., devices in fixed locations or carried by pedestrians) to very high speeds (e.g., high speed trains, etc.). Different techniques and features may provide better performance under different such conditions, at least in some instances. Accordingly, improvements in the field are desired.

SUMMARY OF THE INVENTION

Embodiments are presented herein of apparatuses, systems, and methods for performing radio link monitoring and cell searching when moving at high speeds.

Among the techniques described herein are included techniques for determining the movement speed of a wireless device, including by using GPS capabilities, motion sensing capabilities, and/or the doppler shift of cellular signals received by the wireless device. Additionally, techniques are described for determining the movement speed or even whether a wireless device is in a high speed train scenario (e.g., as a potential additional or alternative determination to the movement speed of the wireless device) based on the cell history of the wireless device, for example based on how recently and/or how often the wireless device has camped on a cell associated with high movement speed, such as a cell in a high speed train network.

It is further described herein that a wireless device may perform cell searching based at least in part on the movement speed of the wireless device, e.g., as may be determined using any of the techniques described herein. For example, cells of a high speed train network may be prioritized during cell searches when a wireless device determines that it has a high movement speed and/or is in a high speed train scenario relative to times when the wireless device determines that it does not have a high movement speed and/or is not in a high speed train scenario.

Still further, it is described herein that a wireless device may perform radio link monitoring based at least in part on the movement speed of the wireless device. For example, one or more radio link parameters may be modified to more quickly and/or aggressively declare radio link failure when a wireless device determines that it has a high movement speed and/or is in a high speed train scenario relative to times when the wireless device determines that it does not have a high movement speed and/or is not in a high speed train scenario.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
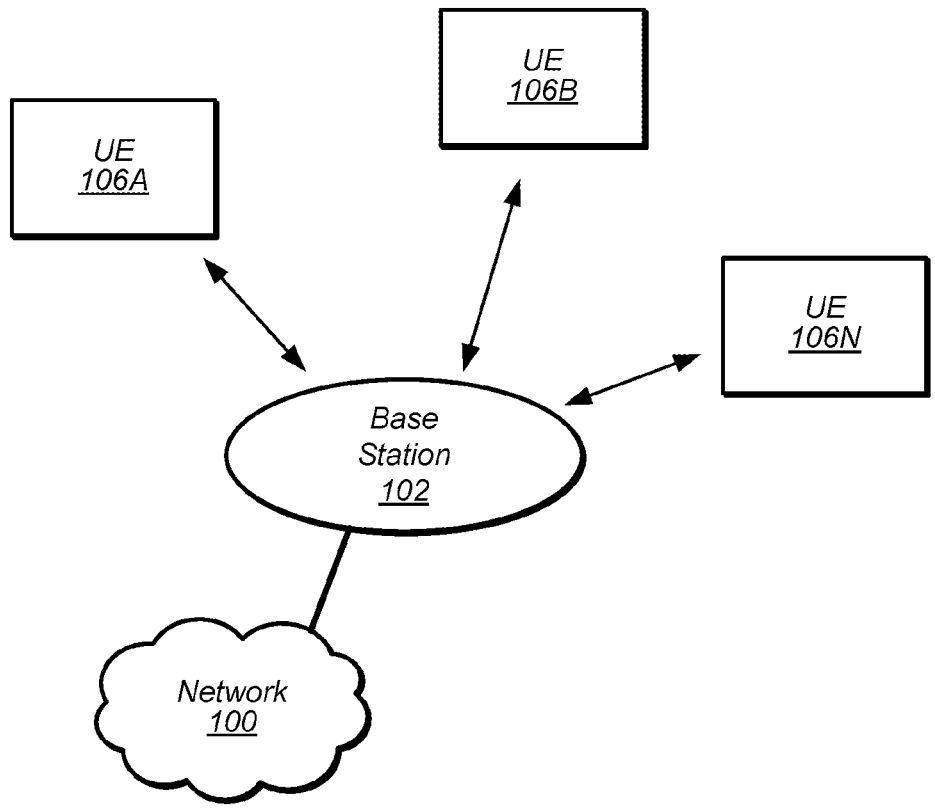
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
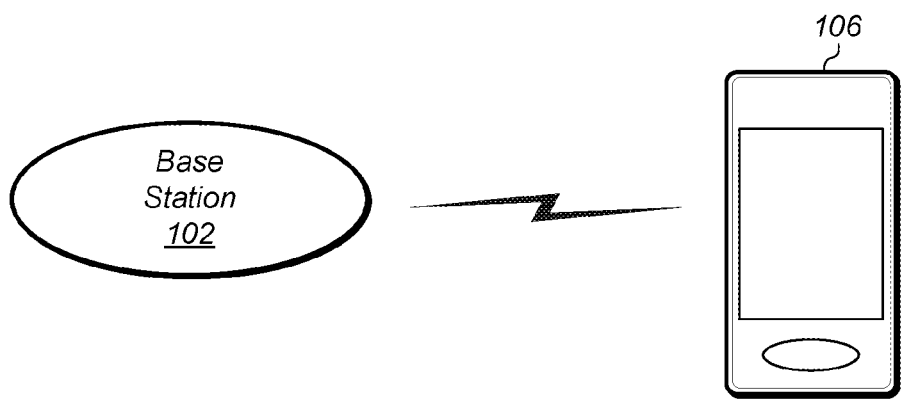
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cell searches and/or radio link monitoring in a manner based at least in part on the movement speed of the UE 106, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH™. Other configurations are also possible.

Figure 3:
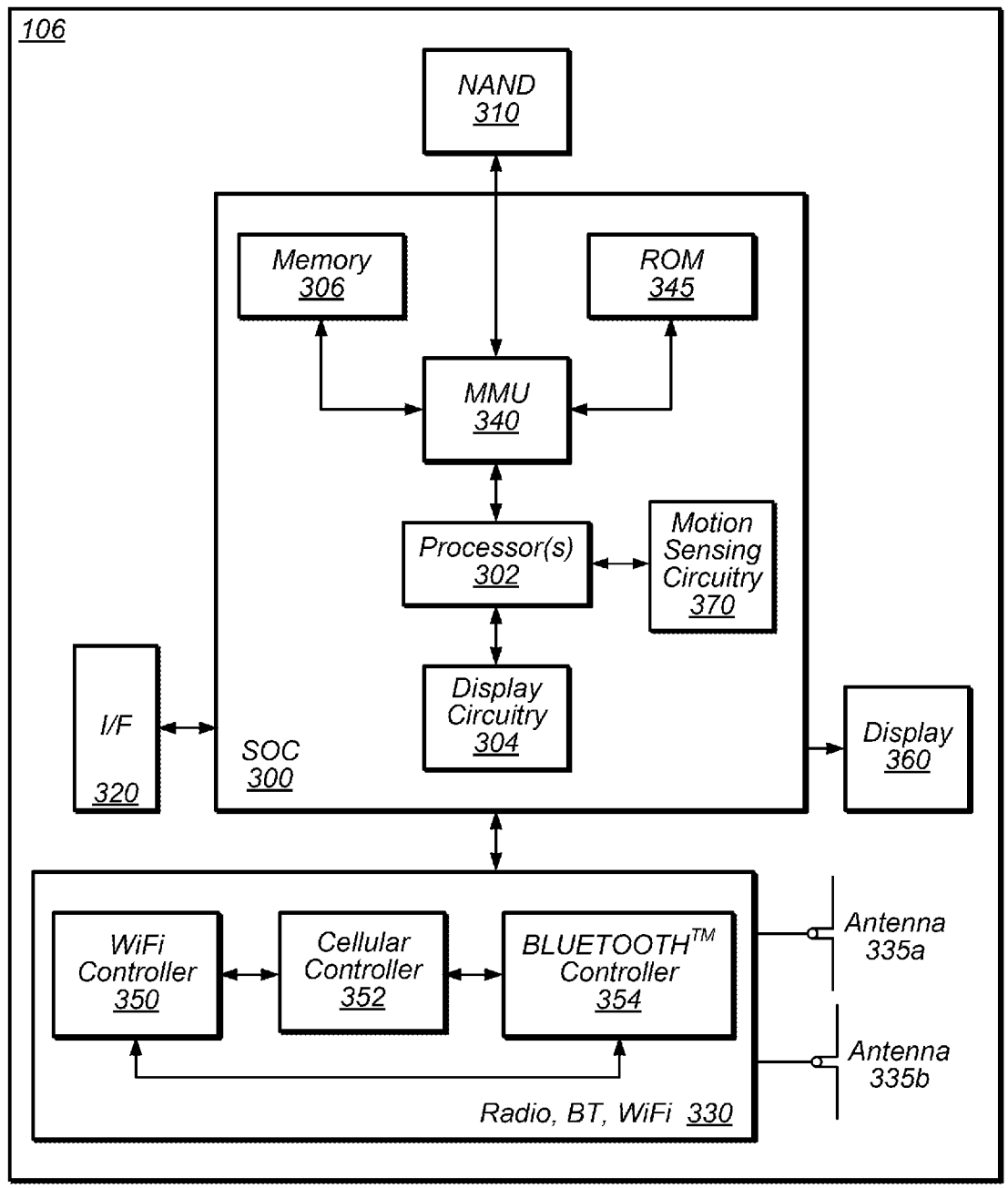
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 345, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform cell searches and/or radio link monitoring in a manner based at least in part on the movement speed of the UE 106. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cell searches and/or radio link monitoring in a manner based at least in part on movement speed according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 350, a cellular controller (e.g. NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 352 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication in unlicensed spectrum by the UE 106. As another possibility, the cellular controller 352 may include hardware and/or software components for generating Wi-Fi physical layer preamble signals, e.g., for transmitting as part of uplink communications by the UE 106 that occur in unlicensed frequency bands.

Figure 4:
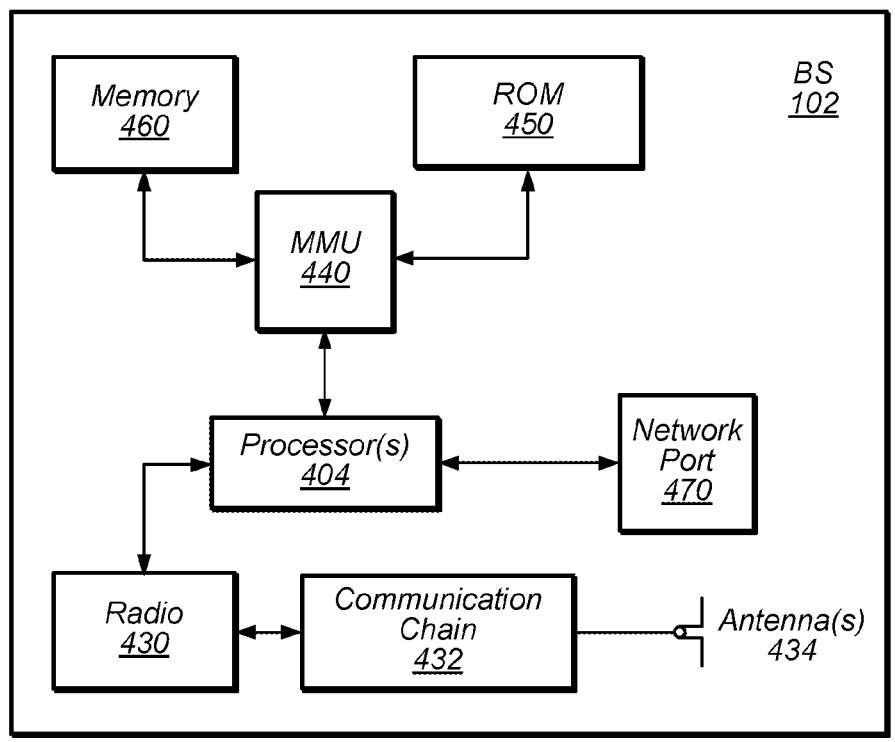
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform cell searches and/or radio link monitoring in a manner based at least in part on wireless device movement speed.

Figure 5:
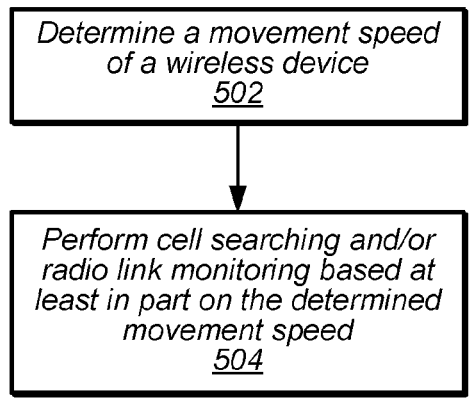
FIG. 5 is a flowchart diagram illustrating aspects of an exemplary possible method for performing radio link monitoring and cell searching based at least in part on movement speed, according to some embodiments.

FIG. 5—Movement Speed Based Cell Searching and Radio Link Monitoring

As wireless device usage grows generally, wireless devices are being used in an increasingly wide range of contexts. One such increasingly wide usage range may include the movement speed of a wireless device. Users may at times utilize their wireless devices when stationary, at pedestrian movement speeds, in motor vehicles, and while in even higher speed forms of transport such as high-speed trains, among various possibilities. The movement speed of a wireless device may have a variety of possible effects on the operation of the wireless device. For example, a wireless device moving at a high speed may move from one cell to another more frequently than a wireless device moving at a lower speed, and each such transition between cells may progress according to a more abbreviated timeline. Provided a wireless device can determine at what speed it is currently moving with sufficient accuracy, it may accordingly be possible to modify certain behaviors of the wireless device in accordance with the movement speed of the wireless device, to potentially improve user experience, reduce power consumption, and/or otherwise provide improved operating characteristics.

Accordingly, FIG. 5 is a flowchart diagram illustrating a method for a wireless device (e.g., a cellular base station or wireless user equipment (UE) device) to perform cell searches and/or radio link monitoring in a manner based at least in part on the movement speed of the wireless device, according to some embodiments.

Aspects of the method of FIG. 5 may be implemented by a wireless device (such as a UE 106 illustrated in and described with respect to various of the Figures herein), or more generally in conjunction with any of the computer systems or devices shown in the above Figures, among other devices, as desired. Note that while at least some elements of the method of FIG. 5 are described in a manner relating to the use of communication techniques and/or features associated with LTE and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the movement speed of the wireless device may be determined. The movement speed determination may be performed in any of various manners, based on any of various possible conditions, as desired.

One possible consideration may include a speed or velocity calculation based on information gathered from a global positioning system (GPS) or other global navigational satellite system (GNSS) module of the wireless device. For example, the wireless device may be able to determine its position as it changes over time and estimate the current speed or velocity of the wireless device based on the magnitude of the change in detected position over time.

Another possible consideration may include a velocity or speed calculation based on measurements performed by motion detection circuitry of the wireless device. For example, the motion detection circuitry may be configured to detect acceleration and/or deceleration, which may thus be useful to determine changes to movement speed and/or to infer or estimate current movement speed or velocity.

A further possible consideration may include an amount of doppler shift detected in cellular communication signals received by the wireless device. For example, if a wireless device is camped on a cell, the wireless device may be able to deduce its velocity based on the accumulated doppler shift of received signals relative to the carrier frequency of the cell. As one possibility the following equation may be used to estimate velocity based on doppler shift:

$$v = \frac{c}{f_c} * f_d$$

where $f_c$ is the carrier frequency in hertz, $f_d$ is the accumulated Dopper shift in hertz, and c is the velocity of light. In some instances, such a doppler shift technique for estimating movement speed may more particularly be used for certain types of cells, such as a cell in a high speed train network or a cell that is otherwise associated with high speed motion.

In addition or as an alternative to such motion estimation techniques, a movement speed or motion state of the wireless device may be determined based at least in part on how often/how many cell re-selections or handovers have occurred recently and/or by what type of cells the wireless device has been recently served. As one such possibility, the wireless device may monitor how many cell re-selections or handovers have occurred within a certain (e.g., recent) time period (which may be referred to as "$T_{CRmax}$", e.g., in a 3GPP context), may determine in which range of multiple possible ranges (e.g., less than a parameter "$N_{CR\_M}$", between $N_{CR\_M}$ and a parameter "$N_{CR\_H}$", or greater than $N_{CR\_H}$, as one possible set of ranges) the number of cell re-selections/handovers falls, and may determine a mobility state (e.g., low, medium, or high, as one possible set of mobility states) of the wireless device corresponding to that range.

As another such possibility, the wireless device may monitor how many cells on which it has camped or otherwise detected within a certain (e.g., recent) time period are of a specific cell type, such as cells associated with high speed motion. For example, certain cells may broadcast an indication that they are associated with high movement speed (or an indication from which it may otherwise be inferred that they are associated with high movement speed), such as cells that are associated with a high speed train network, and the wireless device may thus be able to determine whether its serving cell is such a high movement speed cell, for each cell on which it camps/attaches (and potentially also for some cells detected but not yet camped on). If the number of cells associated with high movement speed on which the wireless device has camped/attached (and/or more generally detected, if desired) within the specified time period is greater than a (e.g., predetermined) threshold, the wireless device may determine that the wireless device has a high movement speed. Once such a determination is made, the wireless device may consider itself to continue to have high movement speed at least until a (e.g., predetermined) period of time passes without a cell re-selection or handover to a new serving cell associated with high movement speed (and possibly more generally without detection of any new cells associated with high movement speed), at which time the wireless device may (e.g., possibly depending on other movement speed indicators, such as any of those previously described herein) no longer consider itself to have high movement speed.

Thus, based on any of a variety of possible conditions that may be indicative of movement speed of the wireless device, including any or all of those just described herein and/or any of various other possible indicators, the wireless device may determine a movement speed and/or mobility state of the wireless device. The determined movement speed/motion state may include a value (e.g., in any of various units of speed or velocity) and/or a relative state (e.g., low/medium/high/etc.) of motion encompassing a range of possible speed/velocity values, among various possibilities.

In 504, the wireless device may perform cell searching and/or radio link monitoring based at least in part on the movement speed of the wireless device. As previously noted herein, it may be beneficial to adjust certain wireless device behaviors based on the movement speed of the wireless device, e.g., to provide features that are well suited to the particular scenario in which the wireless device is currently operating. Two such areas of wireless device behavior that may be so adjusted based on movement speed may include cell searches and radio link monitoring.

A wireless device may perform cell searching under any of a variety of circumstances. As one possibility, a wireless device may perform a cell search when it does not yet have service, e.g., to obtain an initial cell selection after being powered on upon toggling off airplane mode, or while out-of-service. As another possibility, a wireless device may periodically perform a cell search when in idle mode, e.g., to determine whether to remain on the cell on which it is currently camped or to reselect to another (e.g., neighbor) cell. As yet another possibility, a wireless device may perform a cell search after a radio link failure event, e.g., to attempt to recover service (whether from its previous serving cell or another cell) after an interruption. Still another possibility may include an X2L reselection, redirection, or blind fast return, e.g., from an older RAT after a circuit switched fallback (CSFB) or single radio voice call continuity (SRVCC) handover.

A cell search may commonly include scanning one or more frequencies on which cells may be deployed to determine whether any such cells are within communication range of the wireless device, potentially acquiring cell information for one or more candidate cells discovered in the frequency scan, and further potentially attaching to a candidate cell if a suitable such cell is found. The frequencies scanned during the cell search may include frequencies and/or frequency bands stored by the wireless device, e.g., in one or more databases.

As one possibility for adjusting a cell search procedure based on movement speed of the wireless device, the order/priority in which frequencies are scanned may depend on the determined movement speed of the wireless device. For example, the wireless device may maintain a 'high speed' database for frequencies associated with high speed movement (e.g., cells that the wireless device has encountered that are associated with a high speed train network) separate from one or more other frequency databases (e.g., a more general acquisition database for frequencies of cells that the wireless device has previously encountered) or may otherwise maintain information indicating that some subset of its stored frequencies are associated with high movement speed, and may more highly prioritize such frequencies when performing a cell search while at a high movement speed than when performing a cell search while at a lower movement speed. Thus, for a cell search that is performed while a wireless device has determined that it has a high movement speed, one or more frequencies associated with high movement speed may have a high priority may be earlier in the order in which the frequencies are scanned), while for a cell search that is performed while a wireless device has determined that it has a lower movement speed (e.g., does not have a high movement speed), one or more frequencies associated with high movement speed may have a lower priority (e.g., may be later in the order in which the frequencies are scanned, or may not be scanned).

Radio link monitoring may include monitoring characteristics of a radio link to help determine whether it is sufficient for the needs of a wireless device. For example, radio link monitoring may include monitoring a signal quality value (and/or other possible indicators of link quality) for a radio link over a period of time to determine whether the radio link is in-sync or out-of-sync over that period of time. If the radio link is out-of-sync for too long without recovering, the radio link may be declared to have failed (e.g., a radio link failure (RLF) event may have occurred), which may trigger a RRC re-establishment procedure. If the RRC re-establishment procedure is not successful, the wireless device may be forced into idle mode until a new RRC connection can be established (e.g., potentially with a new serving cell).

Since a wireless device moving at a high speed may move from cell to cell more quickly than a wireless device moving at a lower speed, it may be possible that radio link monitoring parameters that provide good performance at lower speeds may result in poorer performance at higher speeds. For example, if a serving cell is quickly weakening and the wireless device triggers RLF on a timeline selected for slower movement speeds, a user may experience a longer service interruption before reselection to a new cell with better signal quality is triggered than if the wireless device were to trigger RLF on a timeline selected for faster movement speeds. In contrast, radio link monitoring parameters selected for high movement speeds could result in premature RLF declaration (e.g., such that RLF is declared when a cell may still recover or when there may not be a more suitable cell yet) when a wireless device is moving at lower movement speeds.

Thus, as one possibility for adjusting a radio link monitoring procedure based on movement speed of the wireless device, one or more radio link monitoring parameters may be modified based at least in part on the movement speed of the wireless device, e.g., such that different parameters may be used at high movement speeds than at lower movement speeds. The parameters may include any of various parameters, including but not limited to an out-of-sync counter maximum (e.g., a number of consecutive and/or accumulated out-of-sync indications that triggers initiation of an out-of-sync timer), a radio link monitoring window length (e.g., a period of time over which signal quality is monitored to determine if an out-of-sync indication or an in-sync indication occurs), an out-of-sync timer length (e.g., a length of time after the out-of-sync counter maximum is reached that the radio link has to recover before radio link failure is declared), a signal quality threshold for determining if the wireless device is out-of-sync during a radio link monitoring window, and/or a signal quality threshold for determining if the wireless device is in-sync during a radio link monitoring window, among various possibilities.

In at least some instances, the radio link monitoring parameters selected may also depend on one or more other considerations, e.g., in addition to movement speed of the wireless device. As one such possibility, the out-of-sync counter maximum (which may also be referred to as "N310", e.g., in a 3GPP based implementation) and/or the out-of-sync timer length (which may also be referred to as "T310", e.g., in a 3GPP based implementation) may further depend at least in part on a connected discontinuous reception (CDRX) cycle timer length currently in use (e.g., since that may affect the radio link monitoring window). For example, a target amount of time for declaring RLF after initially going out-of-sync (e.g., if no recovery occurs in the meantime) for a high speed movement scenario may be determined, and the N310 and T310 values may be adjusted such that RLF would occur after the target amount of time in view of the current CDRX cycle timer length.

As another such possibility, the signal quality threshold for determining if the wireless device is out-of-sync during a radio link monitoring window (which may also be referred to as "$Q_{out}$", e.g., in a 3GPP based implementation) may further depend at least in part on what application or service type or types are currently active at the wireless device. For example, in some instances it may be the case that VoLTE calls may suffer when at high movement speeds even at signal quality levels that may be sufficient at lower movement speeds, such that user experience may benefit (e.g., fewer calls may be dropped, voice quality may be improved, etc.) from use of a higher value for $Q_{out}$ when VoLTE is active in a high movement speed scenario. Thus, in at least some instances, a higher signal quality threshold may be used for determining if the wireless device is out-of-sync when the wireless device is at a high movement speed and when VoLTE (and/or one or more other application or service types sensitive to signal quality at high movement speeds) is active, than when the wireless device is at a lower movement speed and/or when VoLTE (and/or one or more other application or service types sensitive to signal quality at high movement speeds) is not active.

Additional Information

FIGS. 6-12 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
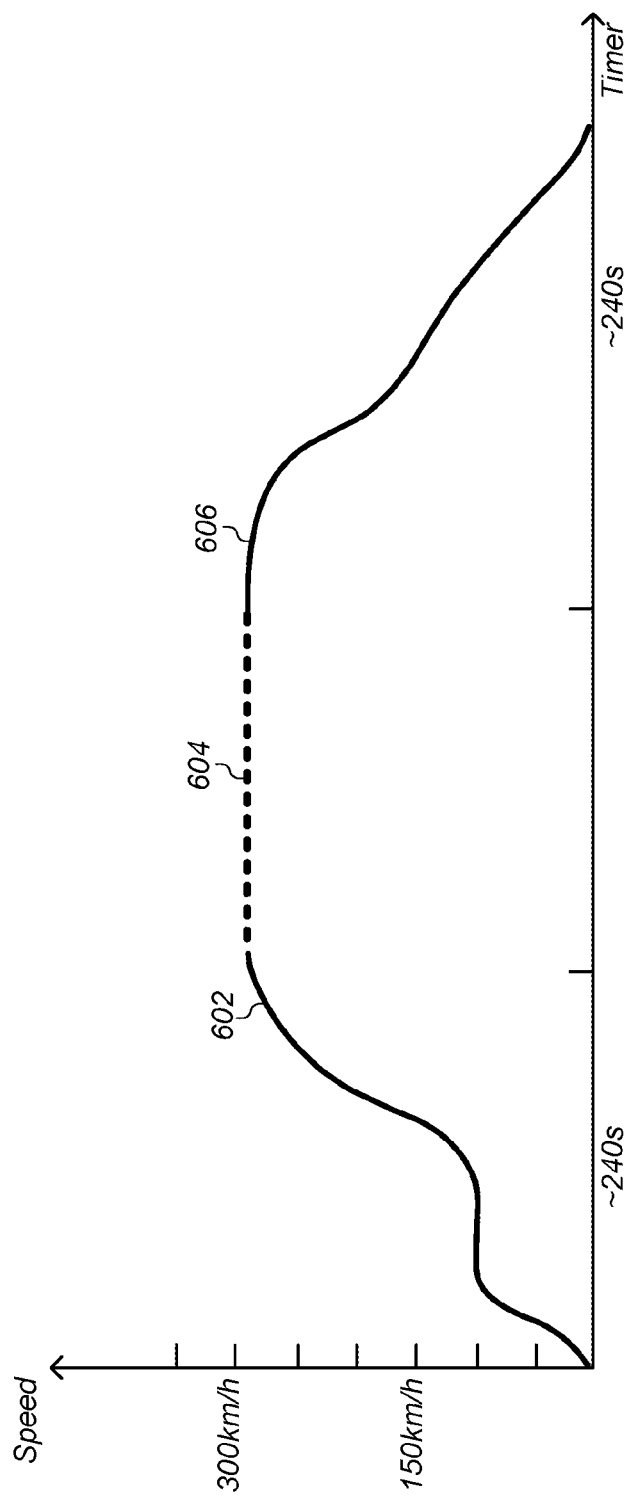
FIG. 6 is a graph illustrating a possible movement speed timeline for a wireless device on a high speed train, according to some embodiments.
Figure 7:
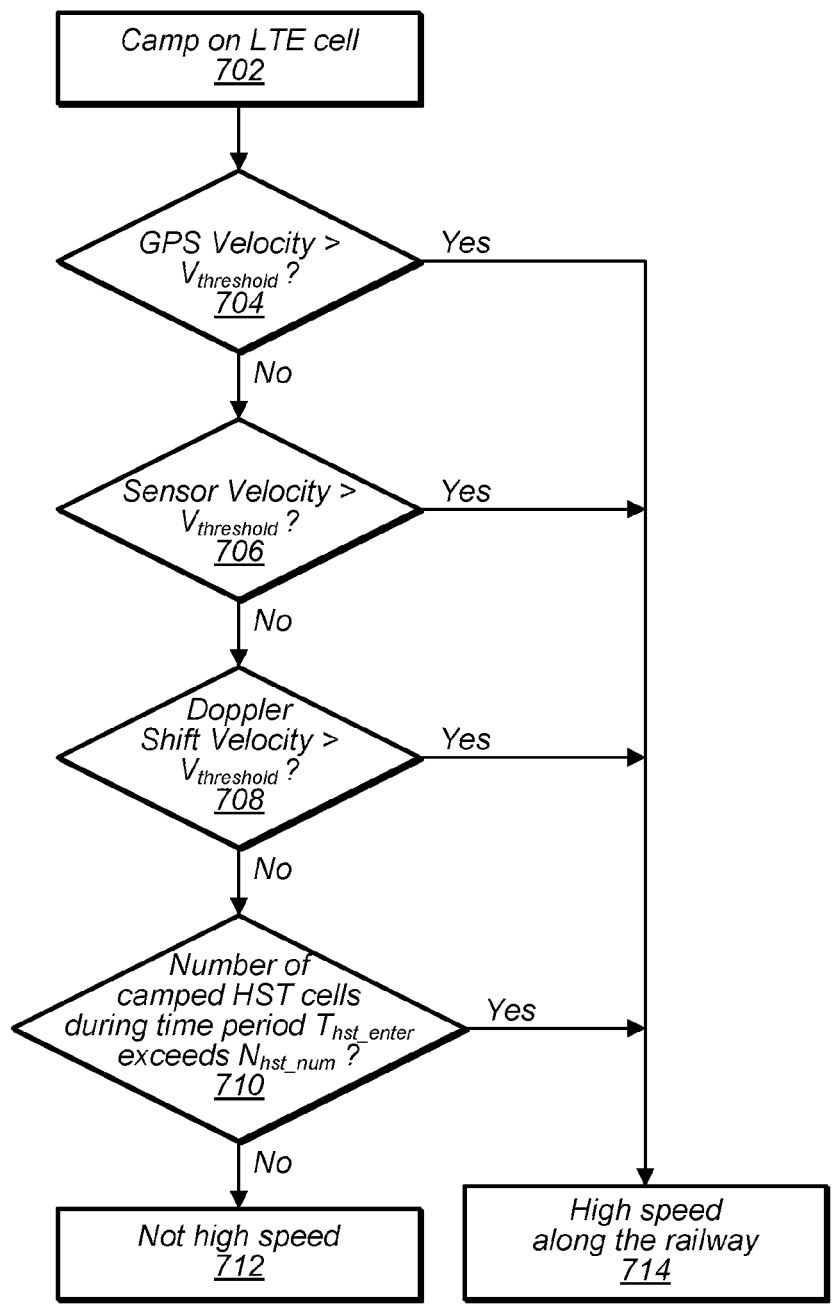
FIG. 7 is a flowchart diagram illustrating aspects of an exemplary possible method for determining whether a wireless device is travelling at high speed, according to some embodiments.
Figure 8:
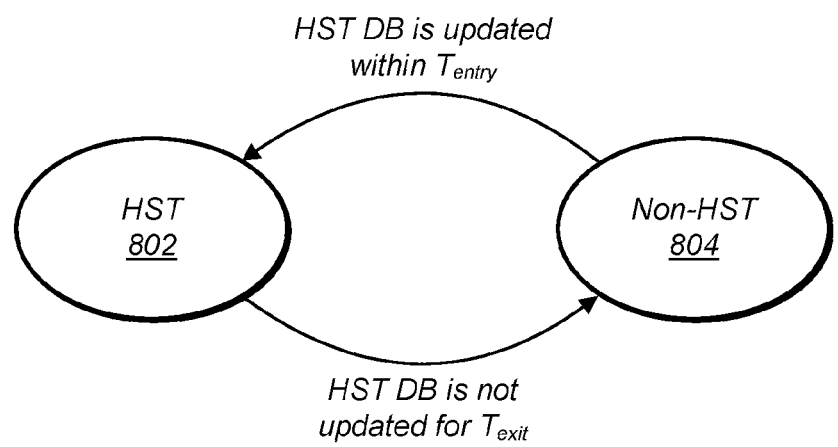
FIG. 8 is a state diagram illustrating possible states and state transitions that could be used for monitoring whether a wireless device is in a high movement speed state, according to some embodiments.

FIGS. 6-8—Movement Speed Determination

As described with respect to FIG. 5, it may be desirable in at least some instances to provide techniques for modifying cell searching, radio link monitoring, and/or other behavior of a wireless device based on movement speed of the wireless device, potentially including for scenarios when the wireless device is moving at relatively high movement speeds, in order to apply such techniques, it may be important to provide the capability to determine the movement speed of a wireless device.

3GPP specification documents include criteria for determining a mobility state of a wireless device based on the frequency of cell reselection/handover. However, such techniques may not be able to accurately identify very high movement speed (e.g., ~300 km/h, as one possibility) scenarios, such as might occur when moving in a high speed train. For example, 3GPP 36.304 section 5.2.4.3 describes a normal mobility state, a high mobility state, and a medium mobility state, along with parameters "$T_{CRmax}$", "$N_{CR\_M}$", and "$N_{CR\_H}$", which may be used to determine in which of those mobility states a wireless device is currently operating at a particular time. Those mobility states may typically correspond to pedestrian movement (e.g., up to approximately 5 km/h), movement by bike (e.g., up to approximately 30 km/h), or movement by car (e.g., up to approximately 120 km/h) ranges and may not allow for a higher range of movement speed (e.g., up to approximately 300 km/h) such as for movement by high speed train.

Since such existing techniques may be insufficient to identify when high speed scenarios are occurring, it may be helpful to provide additional or alternative indications of the movement speed of a wireless device. As one such possibility, it may be useful to attempt to calculate or estimate the velocity of the wireless device from one or more measurements that the wireless device may be capable of performing. For example, in some instances, a wireless device may be able to determine its velocity from one or more of a GPS unit, an LTE frequency offset, and/or motion sensing circuitry of the wireless device. A wireless device may use a combination of such techniques, and/or may use different techniques at different times, for example based on the availability of those techniques and/or other considerations.

As another possibility for determining the movement speed of a wireless device, it may be possible to infer the movement speed of a wireless device based on the type of cells it has encountered, e.g., including cells that it is camped on and/or has recently camped on. For example, it may be the case, at least in some instances, that cells for serving users at such high movement speeds may be deployed for such scenarios; for example, a network of high speed train ("HST") cells may be deployed along a HST railway. Such cells may provide an indication (e.g., a "HighSpeedFlag" parameter provided in system information (e.g., a SIB2) broadcast by such a cell) that they are associated with high speed movement (or more specifically with a high speed train network). According to some embodiments, such HST cells may have a typical cell coverage of approximately 3 km, though any number of other cell coverages are also possible. Thus, a wireless device may be able to determine that a cell is associated with high movement speed when it encounters that cell, and may monitor the number of such HST cells that it detects, on which it has camped, and/or to which it has attached within a recent time period ("$T_{hst\_enter}$"). If that number exceeds a predetermined threshold ("$N_{hst\_num}$"), that may be considered an indication that the wireless device is moving at a high speed.

FIG. 6 is a graph illustrating a possible movement speed timeline for a wireless device on a high speed train, according to some embodiments. As shown, the wireless device may initially be stationary or moving at a relatively low speed (e.g., as the user enters the train), and may accelerate to reach an eventual steady movement speed. During such an acceleration phase 602, it may be possible to use velocity calculations from GPS, and/or it may be possible to use acceleration measurements from motion sensing circuitry (e.g., an accelerometer) of the wireless device (e.g., if the GPS is disabled). At the steady speed phase 604, it may also be possible to use velocity calculations from GPS, if available. If GPS is not available (or it is otherwise desired), it may be possible to estimate velocity from the doppler shift of cellular (e.g., LTE) signals communicated to the wireless device, and/or to estimate velocity based on the duration that the wireless device is camping on an HST cell and/or based on whether $N_{hst\_num}$ is exceeded in the most recent $T_{hst\_enter}$ window. After the steady speed phase 604, the wireless device may slow down to lower speeds (e.g., as the train reaches a station and the user exits the train). In this deceleration phase 606, similar to the acceleration phase 602, it may be possible to use velocity calculations from GPS, and/or it may be possible to use acceleration measurements from motion sensing circuitry of the wireless device.

FIG. 7 is a flowchart diagram illustrating aspects of an exemplary possible method for determining whether a wireless device is travelling at high speed, according to some embodiments. The method may be used in an LTE context (e.g., as shown) according to some embodiments, however, similar methods may also or alternatively be used for determining whether a wireless device is travelling at high speed when communicating according to other RATs, as desired.

As shown, the wireless device may initially camp on an LTE cell (702). It may be determined whether the velocity as measured by a GPS module of the wireless device is above a predetermined velocity threshold ("$V_{threshold}$") (704). If the velocity as measured by the GPS module is greater than $V_{threshold}$, the it may be determined that the wireless device has a high movement speed (e.g., may be in a HST) (714). If the velocity as measured by the GPS module is less than $V_{threshold}$ (or if the GPS measurements are not available), the wireless device may determine whether the velocity as measured by motion sensing circuitry of the wireless device is greater than $V_{threshold}$ (706). If the velocity as measured by the motion sensing circuitry is greater than $V_{threshold}$, the it may be determined that the wireless device has a high movement speed (714). If the velocity as measured by the motion sensing circuitry is less than $V_{threshold}$ (or if measurements from the motion sensing circuitry are not available or inconclusive), the wireless device may further determine if the velocity as measured based on doppler shift is greater than $V_{threshold}$ (708), and if so, it may be determined that the wireless device has a high movement speed (714). However, if the velocity as measured based on doppler shift is not greater than $V_{threshold}$, the wireless device may determine whether the number of camped (or possibly more generally detected) HST cells during $T_{hst\_enter}$ exceeds $N_{hst\_num}$ (710). If the number of camped HST cells during $T_{hst\_enter}$ does exceed $N_{hst\_num}$, it may be determined that the wireless device has a high movement speed (714). Otherwise, it may be determined that the wireless device does not have a high movement speed (712).

Note that the value of $V_{threshold}$ may depend on one or more characteristics of a cell on which the wireless device is currently camped, according to some embodiments. For example, the value of $V_{threshold}$ could be different depending on whether the serving cell is a HST cell or a non-HST cell. Additionally or alternatively, different velocity threshold values may be used for any or all of the velocity comparisons (e.g., in 704, 706, or 708), for example to account for potentially differing precision levels of the different velocity estimation techniques.

Thus, such a method may be useful as one possibility for accurately identifying when a wireless device is moving at a high speed (e.g., along a HST railway). In at least some instances, the baseband processor/domain of the wireless device may perform such a determination and may provide an indication of whether it is moving at a high speed to the application processor/domain of the wireless device. This may assist the wireless device to more effectively implement any desired procedures or techniques in a manner that depends on whether a wireless device is moving at a high speed.

Alternatively or additionally, it may be possible to determine whether a wireless device is in a high-speed train scenario in a manner more reliant on the cell history than on movement speed measurements. As previously noted, a wireless device may be able to determine if a cell is a HST cell, at least in some instances, based on system information broadcast by the cell. A wireless device may maintain a HST database including frequencies of such cells, e.g., such that when a wireless device switches to a new serving cell, its RRC layer may update the frequency point into its HST database if <highSpeedFlag=true> is provided in the SIB2 for the cell. Since HST cells may in at least some instances be adjacent to non-HST cells (e.g., in the vicinity of a train station), it may be the case that users that live or otherwise are active near a railway may have a non-empty HST database. Thus, in order to avoid negatively impacting such users by mistakenly identifying them as being in a high-speed scenario, it may be important to carefully configure any techniques for identifying whether a wireless device is in a high-speed train scenario based on the cell history of the wireless device.

FIG. 8 is a state diagram illustrating possible states and state transitions that could be used for monitoring whether a wireless device is in a high movement speed state based primarily on the cell history of the wireless device, according to some embodiments. As shown, there may be a HST state 802 and a non-HST state 804 defined according to the state diagram. The status of a wireless device may be judged on each occasion that a cell switch occurs and an SIB2 associated with the new cell is received, according to some embodiments. The entry condition into the HST mode may include the HST database timer of a frequency being reset/updated within a predetermined time period ("$T_{entry}$"), e.g., which may occur when a new HST serving cell is added to the HST database or a previously visited HST serving cell has its HST database timer reset as a result of being used as a serving cell again.

The exit condition from the HST mode may include the HST database not being updated for a predetermined time period ("$T_{exit}$"). Thus, the wireless device may not immediately leave the HST mode when going out-of-service, when an HST cell deployment hole is encountered, when exiting a train, or when temporarily stopping (e.g., at an intermediate station), but may eventually leave the HST mode if such conditions persist for sufficiently long. Additionally, this may help avoid users living along the railway line remaining indefinitely in the HST mode, e.g., as it may the case that such users may not perform handover or reselect new serving cells as rapidly as when travelling on a high speed train, and may thus exit the HST mode relatively quickly even if such a mode is triggered due to proximity to a HST railway.

Figure 9:
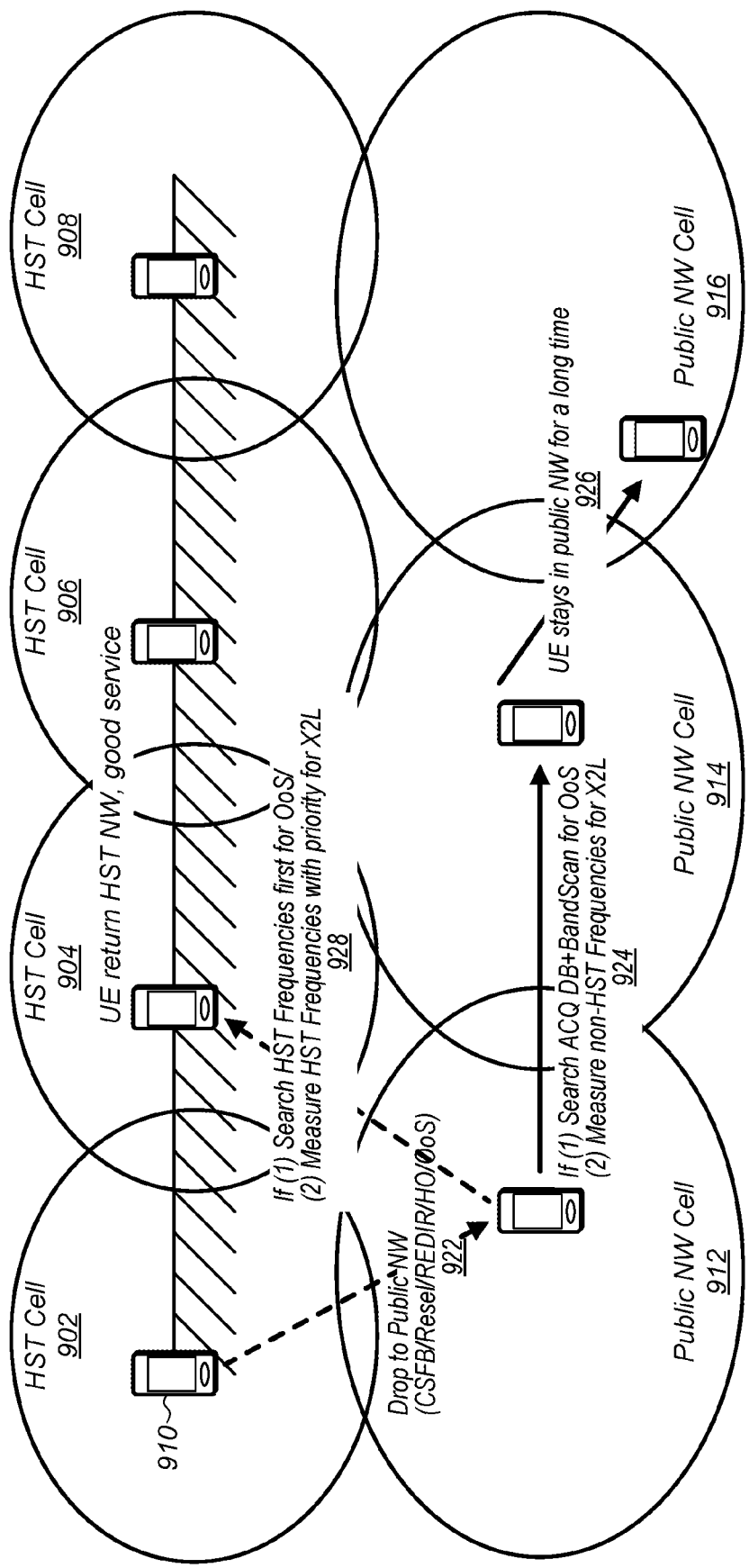
FIG. 9 is a diagram illustrating exemplary possible cell transitions for a wireless device moving on a high speed train, according to some embodiments.

FIG. 9—High Speed Train Scenario

FIG. 9 is a diagram illustrating exemplary possible cell transitions for a wireless device moving on a high speed train, according to some embodiments. As previously noted, at least in some instances, high speed train cell networks may be deployed in the vicinity of high speed train railways. Such networks may deploy cells on different frequencies than public networks, according to some embodiments. The HST Cells 902, 904, 906, 908 illustrated in FIG. 9 may be representative of several cells of a HST network, according to some embodiments.

In many locations, there may be one or more cells belonging to a public network in the vicinity of the cells of a HST network. The public network cells 912, 914, 916 illustrated in FIG. 9 may be representative of several such cells, according to some embodiments. In some locations (e.g., railway stations), there may be mutual neighbor relationships between HST cells and public cells. In some locations (e.g., along a railway line), it may also be possible that there may be a one way neighbor relationship from an HST cell to a public cell (e.g., LTE, GSM, UTRAN, etc.).

In such a case, after a wireless device moves to a public network (e.g., due to CSFB, reselection, redirection, handover, out-of-service, or for any other possible reason), such as illustrated in cell transition 922 of wireless device 910 from HST cell 902 to public network cell 912, the subsequent cell transition(s) performed by the wireless device 910 may depend considerably on the cell search technique(s) used by the wireless device 910.

For example, while a wireless device may maintain a HST cell database (e.g., as previously noted), at least according to some embodiments, if the wireless device is not capable of accurately determining when it is in a HST scenario, it may still be possible for a wireless device to mistakenly prioritize HST cells when not in a HST scenario (e.g., if adjacent to a high speed railway but not on a train), or to fail to prioritize HST cells when actually in a HST scenario (e.g., if a wireless device moves to a public cell while on a train, such as in the illustrated cell transition 922 in FIG. 9).

In a situation in which a wireless device fails to recognize that it is in a HST scenario, it may not prioritize HST cells during cell searches (e.g., searching a standard acquisition database and/or performing a band scan when out-of-service (OoS) or performing an initial cell selection, or performing measurements on non-HST frequencies for X2L re-selections/redirections), which may result in a selection/reselection/redirection to another public network cell, such as illustrated in cell transition 924 of wireless device from public network cell 912 to public network cell 914. In such a situation, the wireless device 910 may continue such transitions (e.g., including cell transition 926 from public network cell 914 to public network cell 916) and may have difficulty returning to the HST network, potentially resulting in an increased rate of call drops, lost paging indications/messages, and/or radio link failure occurrences.

In contrast, if a wireless device is able to recognize that it is in a HST scenario (e.g., even if it is not currently camped on a HST cell, such as by utilizing any of the movement speed/mobility state determination techniques described herein), it may be able to prioritize HST cells during cell searches. For example, when OoS or performing an initial cell selection or background X2L cell selection, a wireless device may search HST frequencies prior to searching frequencies in the legacy acquisition database and/or prior to performing a band scan. Similarly, for X2L reselection/redirection or blind fast return, the (e.g., LTE) HST database may be measured/searched with a higher priority. This may include blind configuring the HST database for measurements before the SIB (e.g., SI2quater) is received and adjusting HST frequency priority accordingly after the corresponding SIB is received for reselection, and/or configuring the HST database in the X2L redirection list for redirection. This may result in a relatively rapid selection/reselection/redirection from OoS or from a public network (possibly non-LTE RAT) cell back to a HST network cell, such as illustrated in cell transition 928 of wireless device from public network cell 912 to HST network cell 904. In such a situation, the wireless device 910 may continue such transitions from HST cell to HST cell, potentially resulting in decreased radio link failure rate, call drop rate, paging loss rate, and/or overall improved usability and user experience.

Figure 10:
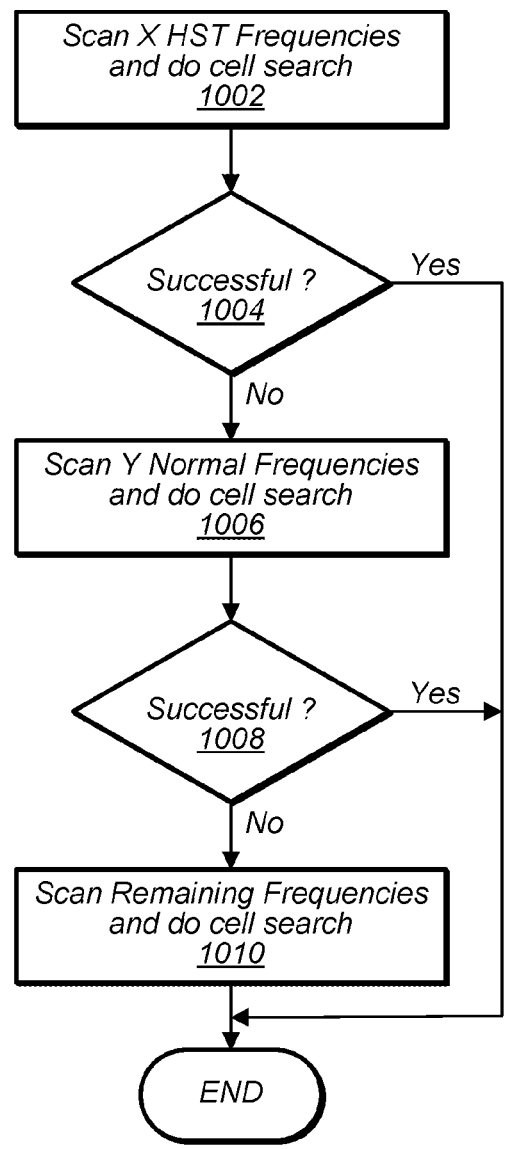
FIG. 10 is a flowchart diagram illustrating aspects of an exemplary possible method for performing a cell scan after a radio link failure event when a wireless device is moving at a high movement speed, according to some embodiments.

FIG. 10—Frequency Scan After Radio Link Failure Flowchart

In addition to cell searches such as those performed for initial cell selection, OoS cell searching, background X2L cell selection. X2L re-selections/redirections, blind fast return and idle mode re-selections, a wireless device may perform frequency scanning and cell searching as part of a RRC re-establishment procedure after a radio link failure event until RRC re-establishment is successful or until a T311 timer expires, according to some embodiments. At least in some instances, the T311 timer may be set as a relatively short value (e.g, 1 second long, as one possibility in a HST network cell), such that it may be difficult to complete a full frequency scan and cell search prior to expiration of the timer. After the T311 timer expires without successful RRC re-establishment, the wireless device may enter idle mode, leading to a potential service break and poor user experience. For example, if this occurs while a VoLTE call is active, a call drop may occur. In order to improve the likelihood of recovering service prior to expiration of the T311 timer/reduce the likelihood of such service interruptions, it may be useful to prioritize HST cells when performing frequency scanning after a radio link failure event and prior to expiration of the T311 timer when a wireless device is determined to be at a high movement speed or otherwise determined to be in a HST scenario.

FIG. 10 is a flowchart diagram illustrating aspects of an exemplary possible method for performing a cell scan after a radio link failure event when a wireless device is moving at a high movement speed, according to some embodiments. As shown, the frequency scan may be split into multiple (e.g., 3) steps, which may help allow the wireless device to complete cell selection before the T311 timer expires. The wireless device may first scan up to a predetermined number ("X") of HST frequencies (e.g., from the HST database stored by the wireless device) (1002). It may be determined if this is successful (1004), and if so, the process may be complete. If not, the wireless device may next scan up to a predetermined number ("Y") of normal frequencies (e.g., from a legacy acquisition database stored by the wireless device) (1006). It may be determined if this is successful (1008), and if so, the process may be complete. If not, the wireless device may next scan up to any remaining frequencies (e.g., from the HST database and/or the legacy acquisition database stored by the wireless device) (1010). If successful, this may result in radio link recovery, or if unsuccessful, the T311 timer may expire, in either case resulting in completion of the process.

Figure 11:
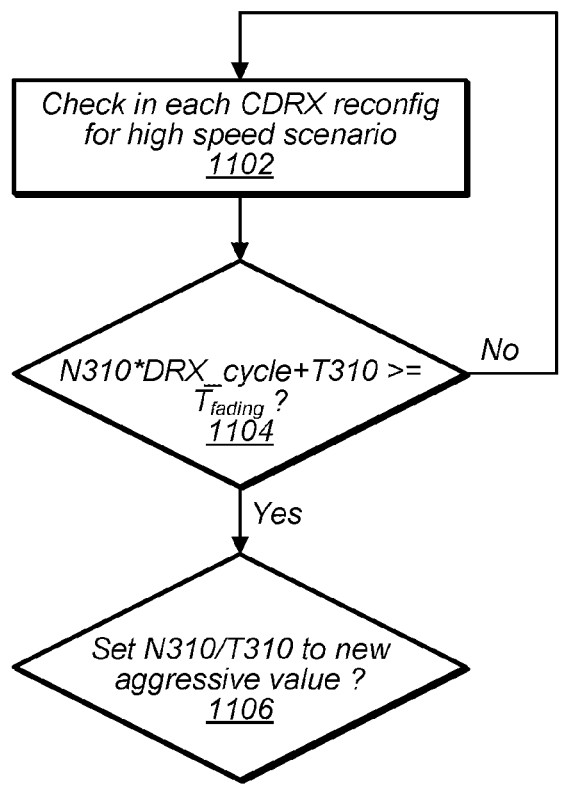
FIGS. 11-12 are flowchart diagrams illustrating aspects of exemplary possible methods for performing radio link monitoring based at least in part on movement speed, according to some embodiments.
Figure 12:
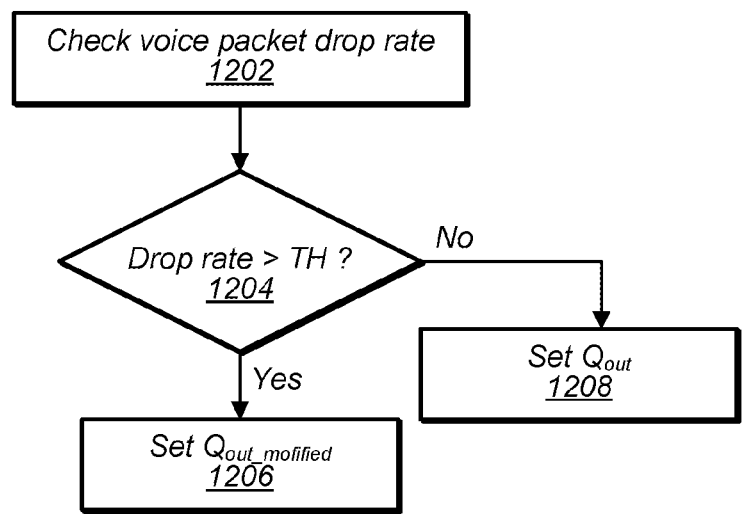

FIGS. 11-12—Movement Speed and/or Application Based Radio Link Monitoring Flowchart Radio link monitoring (RLM), e.g., as defined in 3GPP, may include techniques for determining when cell coverage is too poor for use by a wireless device. At least according to some embodiments, the radio link monitoring process may include determining radio link signal quality, and if it is below a certain threshold ($Q_{out}$), providing an indication from the lower layers to RRC that the radio link is out-of-sync. Upon receiving a certain number (N310) of consecutive out-of-sync indications from lower layers, RRC may start a timer (T310). The T310 timer may be stopped or reset under certain conditions (e.g., if the radio link recovers), however, if T310 expires, RRC may declare radio link failure.

In a high speed scenario (e.g., when traveling on a HST), it may be possible that network configured RLM parameters (e.g., that may be intended for communication while at slower speeds) may not trigger RLF in a timely manner, which may result in poor downlink and/or uplink key performance indicators (KPIs) and/or potential mobile terminated calls being missed. For example, under a high speed scenario, SNR may degrade rapidly (e.g., signal quality may drop below $Q_{out}$ within is under a HST scenario, in some instances), but the out-of-sync indication interval may be the CDRX cycle length (e.g., if configured, or possibly every radio frame if CDRX is not configured), such that in a network configuration with N310 equal to 20 and a CDRX cycle length of 320 ms, T310 may not be triggered until 6400 ms after signal quality falls below $Q_{out}$. This may result in a substantial service gap before the wireless device triggers RLF and attempts to recover service, e.g., on a new serving cell.

Additionally, some applications may be more sensitive to signal quality when moving at high speeds. For example, in a high speed scenario, in some instances a VoLTE call may not work even when signal quality is above $Q_{out}$. $Q_{out}$ may be defined in 3GPP as a signal quality level resulting in a 10% block error rate for the PDCCH, which may be a worse signal quality level than for PDSCH/PUSCH decoding. Thus, it may be possible for a UL grant to be insufficient to support an uplink VoLTE packet, e.g., if uplink transmission power is limited (e.g., may have a maximum power value "Pmax"), as the network may not assign sufficient uplink bandwidth and/or MCS may be low since uplink signal is poor. For example, consider a scenario in which a VoLTE call is established using AMR codec rate of 23.85 kbps, such that 110 bytes may be required per 20 ms. An uplink grant with (3 PRB, 0 MCS) may be limited to 7 bytes per 5 ms, or 28 bytes per 20 ms, which may be insufficient for the voice packets, resulting in most voice packets timing out and being discarded. When such a scenario occurs, the wireless device may be able to recover the VoLTE call if the wireless device performs handover or otherwise re-establishes to a new cell, but if cell signal quality is above $Q_{out}$, the wireless device may remain in the serving cell.

Thus, if RLM parameters are not differentiated between high speed (e.g., HST) and other scenarios, as may be common for at least some networks, wireless devices may suffer from the potentially long duration of the RLM process and/or from staying under a serving cell without triggering RLF despite insufficient signal quality. Such problems may be remedied by taking some or all of movement speed, C-DRX cycle, and/or application/service type into consideration when performing RLM. Accordingly, FIGS. 11-12 are flowchart diagrams illustrating aspects of exemplary possible methods for performing radio link monitoring based on movement speed, C-DRX cycle, and/or application/service type, according to some embodiments.

As previously noted, the RLM parameters used when performing RLM may include an N310 value, a T310 timer value, and/or a $Q_{out}$ value. One possibility for performing RLM based at least in part on movement speed may include modifying one or both of the N310 value and the T310 timer value based on the movement speed and the C-DRX cycle length of a wireless device. FIG. 11 is a flowchart illustrating such a method. As shown, at each CDRX reconfiguration, it may be determined whether the wireless device is in a high speed scenario (1102). If the wireless device is not in a high speed scenario, the network configured N310 and T310 values may be used. If the wireless device is in a high speed scenario, it may further be determined whether the total length of time from initially going out-of-sync to declaring radio link failure (i.e., N310*DRX_cycle+T310) is greater than or equal to a desired length of time (which may be referred to as "$T_{fading}$") from initially going out-of-sync to declaring radio link failure (1104). If it is not, the network configured N310 and T310 values may be used. However, if it is, N310 and/or T310 may be set to modified (e.g., more aggressive) values (1106). For example, N310 may be adjusted based on the CDRX cycle length, e.g., with values specified for each of various possible CDRX configurations (e.g., 'N1' for no CDRX, "N2" for CDRX_cycle=40 ms, "N3" for CDRX_cycle>=160 ms, as one possibility), while T310 may be limited to a desired value "$T_{recovery}$". The N1/N2/N3/$T_{recovery}$ values may be selected for good performance based on field testing, as one possibility, or may be selected in any other desired manner. As one possibility, the N1/N2/N3 values may be selected such that the length of time from initially going out-of-sync to triggering the T310 timer may be on the order of 100-200 ms, while $T_{recovery}$ may be selected as 1000 ms. As will be recognized, such values are provided for illustrative purposes only, and any other desired values may alternatively or additionally be used, as desired.

Another possibility for performing RLM based at least in part on movement speed may include modifying the $Q_{out}$ value based on the movement speed and the service type(s) active at a wireless device. FIG. 11 is a flowchart illustrating such a method, in particular in relation to voice call services in a high movement speed scenario. According to some embodiments, the method of FIG. 12 may be performed when a wireless device has already determined that it is in a high movement speed scenario. As shown, the wireless device may check the current voice packet drop rate, e.g., including the drop rate of QCI=1 packets in the uplink buffer (1202). It may be determined if the drop rate is greater than a desired threshold (1204). If the drop rate is not greater than the desired threshold, the network configured $Q_{out}$ value may be used (1206). However, if the drop rate is greater than the desired threshold, a modified (e.g., higher) $Q_{out}$ value ("$Q_{out\_modified}$") may be used (1208). Note that the wireless device may repeat the method occasionally/periodically, such that if the drop rate falls below the desired threshold again at a later time, the wireless device may resume using the network configured $Q_{out}$ value. The $Q_{out\_modified}$ value may be selected for good performance based on field testing, as one possibility, or may be selected in any other desired manner.

Such techniques may help prevent missed mobile terminated calls, may help a wireless device re-establish to a potentially better cell more quickly, and/or may improve downlink and/or uplink KPIs, according to some embodiments. Additionally, for VoLTE calls (and/or other services that may be sensitive to signal quality at high movement speeds), use of parameters leading to more aggressive RLF declaration and/or higher $Q_{out}$ values may allow a wireless device to re-establish to a new and potentially better cell (with potentially improved user experience) when network configured parameters might lead to the wireless device remaining on a serving cell even when it is unable to support a VoLTE call.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
at least one processor configured to cause a wireless device to:
determine a mobility state of the wireless device;
receive a system information block (SIB) from a first cell of a plurality of cells, wherein the SIB includes an indication the cell is a high speed cell;
perform a cell search, wherein the cell search comprises scanning the plurality of cells within communication range of the wireless device, wherein the plurality of cells comprise one or more first cells that are a high speed cells and one or more second cells that are not high speed cells; and
select, as part of a reselection process, a cell of the plurality of cells,
wherein, when the mobility state of the wireless device corresponds to a high speed scenario, the reselection process selects a cell from the one or more first cells identified as high speed cells, wherein said selecting the cell of the plurality of cells includes identifying at least the first cell as a high speed cell in the reselection process based on the indication in the SIB, and
wherein, when the mobility state of the wireless device does not correspond to a high speed scenario, the reselection process selects a cell from the one or more second cells that are not a high speed cell.

2. The apparatus of claim 1, wherein determining the mobility state of the wireless device comprises determining the mobility state of the wireless device corresponds to a high speed scenario and wherein said selecting the cell of the plurality of cells includes selecting the first cell based on the mobility state of the wireless device corresponding to the high speed scenario.

3. The apparatus of claim 1, wherein prioritizing selection of cells identified as high speed cells includes prioritization of one or more frequencies associated with high movement speed.

4. The apparatus of claim 1, wherein the at least one processor is further configured to cause the wireless device to, at a later time:
   determine that the wireless device has not reselected to a serving cell associated with high movement speed for at least a predetermined period of time; and
   perform a second cell search, wherein the high speed cells have lower priority during the second cell search based at least in part on determining that the wireless device has not reselected to a high speed cell for at least the predetermined period of time.

5. The apparatus of claim 1, wherein determining the mobility state of the wireless device is based on one or more of:
   an amount of doppler shift detected in cellular communication signals received by the wireless device;
   a velocity calculation based on information from a global positioning system (GPS) module of the wireless device;
   one or more measurements performed by motion sensing circuitry of the wireless device; or
   a number of cell re-selections and/or handovers that have occurred within a predetermined period of time.

6. The apparatus of claim 1, wherein the at least one processor is further configured to cause the wireless device to:
   modify one or more radio link monitoring parameters for the wireless device based at least in part on determining the mobility state of the wireless device corresponds to a high speed scenario.

7. A method, comprising:
   by a wireless device:
      determining a mobility state of the wireless device;
      receiving a system information block (SIB) from a first cell of a plurality of cells, wherein the SIB includes an indication the cell is a high speed cell;
      performing a cell search, wherein the cell search comprises scanning the plurality of cells within communication range of the wireless device, wherein the plurality of cells comprise one or more first cells that are a high speed cells and one or more second cells that are not high speed cells; and
      selecting, as part of a reselection process, a cell of the plurality of cells,
         wherein, when the mobility state of the wireless device corresponds to a high speed scenario, the reselection process selects a cell from the one or more first cells identified as high speed cells, wherein said selecting the cell of the plurality of cells includes identifying at least the first cell as a high speed cell in the reselection process based on the indication in the SIB, and
         wherein, when the mobility state of the wireless device does not correspond to a high speed scenario, the reselection process selects a cell from the one or more second cells that are not a high speed cell.

8. The method of claim 7, wherein determining the mobility state of the wireless device comprises determining the mobility state of the wireless device corresponds to a high speed scenario and wherein said selecting the cell of the plurality of cells includes selecting the first cell based on the mobility state of the wireless device corresponding to the high speed scenario.

9. The method of claim 7, wherein prioritizing selection of cells identified as high speed cells includes prioritization of one or more frequencies associated with high movement speed.

10. The method of claim 7, further comprising, at a later time:
    determining that the wireless device has not reselected to a serving cell associated with high movement speed for at least a predetermined period of time; and
    performing a second cell search, wherein the high speed cells have lower priority during the second cell search based at least in part on determining that the wireless device has not reselected to a high speed cell for at least the predetermined period of time.

11. A wireless device, comprising:
    an antenna;
    a radio operably coupled to the antenna; and
    at least one processor operably coupled to the radio;
    wherein the antenna, radio, and at least one processor are configured to:
       determine a mobility state of the wireless device;
       receive a system information block (SIB) from a first cell of a plurality of cells, wherein the SIB includes an indication the cell is a high speed cell;
       perform a cell search, wherein the cell search comprises scanning the plurality of cells within communication range of the wireless device, wherein the plurality of cells comprise one or more first cells that are a high speed cells and one or more second cells that are not high speed cells; and
       select, as part of a reselection process, a cell of the plurality of cells,
          wherein, when the mobility state of the wireless device corresponds to a high speed scenario, the reselection process selects a cell from the one or more first cells identified as high speed cells, wherein said selecting the cell of the plurality of cells includes identifying at least the first cell as a high speed cell in the reselection process based on the indication in the SIB, and
          wherein, when the mobility state of the wireless device does not correspond to a high speed scenario, the reselection process selects a cell from the one or more second cells that are not a high speed cell.

12. The wireless device of claim 11, wherein determining the mobility state of the wireless device comprises determining the mobility state of the wireless device corresponds to a high speed scenario and wherein said selecting the cell of the plurality of cells includes selecting the first cell based on the mobility state of the wireless device corresponding to the high speed scenario.

13. The wireless device of claim 11, wherein prioritizing selection of cells identified as high speed cells includes prioritization of one or more frequencies associated with high movement speed.

14. The wireless device of claim 11, wherein the at least one processor is further configured to cause the wireless device to, at a later time:
    determine that the wireless device has not reselected to a serving cell associated with high movement speed for at least a predetermined period of time; and
    perform a second cell search, wherein the high speed cells have lower priority during the second cell search based at least in part on determining that the wireless device has not reselected to a high speed cell for at least the predetermined period of time.

15. The method of claim 7, wherein determining the mobility state of the wireless device is based on one or more of:
- an amount of doppler shift detected in cellular communication signals received by the wireless device;
- a velocity calculation based on information from a global positioning system (GPS) module of the wireless device;
- one or more measurements performed by motion sensing circuitry of the wireless device; or
- a number of cell re-selections and/or handovers that have occurred within a predetermined period of time.

16. The method of claim 7, further comprising:
modifying one or more radio link monitoring parameters for the wireless device based at least in part on determining the mobility state of the wireless device corresponds to a high speed scenario.

17. The wireless device of claim 11, wherein the at least one processor is further configured to cause the wireless device to:
modify one or more radio link monitoring parameters for the wireless device based at least in part on determining the mobility state of the wireless device corresponds to a high speed scenario.

18. The method of claim 7, wherein prioritizing selection of cells identified as high speed cells includes prioritization of one or more frequencies associated with high movement speed.

19. The wireless device of claim 11, wherein prioritizing selection of cells identified as high speed cells includes prioritization of one or more frequencies associated with high movement speed.

20. The wireless device of claim 11, wherein the at least one processor is further configured to cause the wireless device to, at a later time:
- determine that the wireless device has not reselected to a serving cell associated with high movement speed for at least a predetermined period of time; and
- perform a second cell search, wherein the high speed cells have lower priority during the second cell search based at least in part on determining that the wireless device has not reselected to a high speed cell for at least the predetermined period of time.

* * * * *